SPLICING OF PREPRINTED WEBS

Filed Feb. 11, 1963

Inventors
Dennis H Bent
Sidney A. Kirk
Edward D. Astley
By Kenyon Palmer
Stewart & Estabrook
Attorneys 3,161,366

SPLICING OF PREPRINTED WEBS

Dennis Herbert Bent, Sidney Arthur Kirk, and Edward Thomas Astley, London, England, assignors to Crosfield Electronics Limited, London, England, a British company Filed Feb. 11, 1963, Ser. No. 257,400
Claims priority, application Great Britain, Feb. 13, 1962, 5,495/62
4 Claims. (Cl. 242—58.3)

Figure 1:
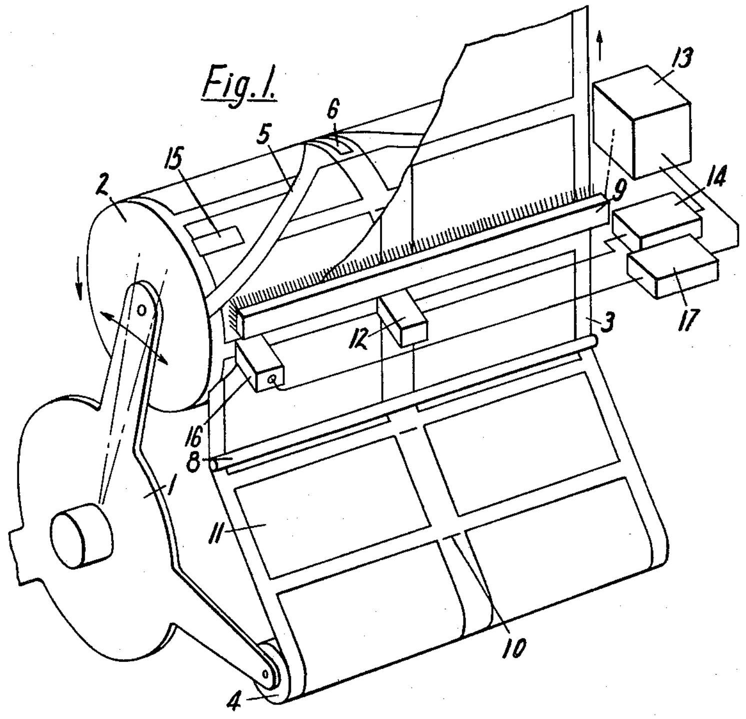

In the printing of a continuous web of paper using a rotary printing press, the paper is fed into the press from a reel and, as soon as one reel is exhausted, the end of the web on a new reel must be pasted to the end of the web on the old reel in order to maintain the continuity of operation in the press. To avoid stopping the press, which would be necessary for manual pasting, automatic apparatus has been proposed for sticking the end of the old web to the new reel of paper. In one form of such apparatus the two reels of paper are mounted in a stand angularly spaced about the centre of the stand. As the end of the reel in use approaches, the reel stand is turned in its bearings so as to bring a new reel into the operative position, where it is rotated by a belt surface-drive or a core drive. The paper which is still being drawn off the old reel is led past the periphery of the new reel which is driven so that its periphery moves at substantially the same speed as the paper leaving the old reel. A coating of adhesive material is provided over a short length of the periphery of the new reel to enable the two webs to be stuck together by pressing the surface of the old web against the new reel.

When the webs which are being fed from the reels are preprinted, for example when they have been printed in one or more colours and require to be passed to the press again for printing in a further colour or for cutting, there is the additional problem that the new reel must be joined to the old web with the patterns of the two webs in good register, as otherwise considerable quantities of paper will be wasted before the register-controlling mechanism of the press can achieve good register between the web from the new reel and the printing or cutting devices acting on it. Prior proposals for detecting register marks on the two webs have usually involved the use of two sensing photo-electric scanning heads positioned one at a point along the path of the expiring web and one adjacent the periphery or the sides of the reel away from the expiring web so as not to be obstructed by the latter.

Difficulties are experienced in connection with photo-electric sensing of the mark on the new reel because if the mark is on the side of the new reel lateral movements of the reel cause considerable variation in the distance between the mark and the photo-electric device, which has a fixed focal length, and if the mark is on the periphery of the new reel changes in diameter from reel to reel cause variation in the gap between the register mark and the photo-electric device.

In order to facilitate splicing webs from new reels of different diameters means are normally provided for adjusting the position of the centre of the new reel so that the distance between the periphery of the new reel and the web from the old reel is constant at the splicing position and independent of the diameter of the new reel and according to the present invention, in such a machine, the first sensing device is responsive to the passage of a ferro-magnetic register mark on the periphery of the rotating new reel and is mounted adjacent to the position of operation of the splicing means on the side of the expiring web remote from the rotating new reel for sensing the ferro-magnetic register mark on the periphery of the rotating new reel through the expiring web and generating signals indicating the revolution of the new reel and the second sensing device is responsive to the passage of register marks on the expiring web and generates signals indicating the passage of pattern units on the expiring web. Register-detecting means, responsive to signals from the first and second sensing devices, initiate the operation of means for splicing the expiring web to the web on the rotating new reel when the interval between signals from the first and second sensing devices indicates that a desired register condition exists between the preprinted webs. This arrangement has the advantage that the gap between the sensing device and the register mark on the new reel is substantially constant and independent of the diameter of the new reel.

Means may be provided for adjusting the speed of rotation of the new reel by amounts which are either dependent on the register error between the preprinted webs as indicated by the interval between signals from the first and second sensing devices received by the register detecting means or independent of the magnitude of this register error. The Patents Nos. 3,042,332 and 2,899,143 describe methods of detecting when a desired register condition suitable for the initiation of a splicing operation exists between the preprinted webs and varying the speed of rotation of the new reel. Apparatus embodying the present invention is suitable for use in the systems disclosed in these earlier patents, being equally applicable to those systems which depend for their successful operation on the periphery of the new reel being equal to an integral number of pattern lengths and to those which allow for the occurrence of a jump in register on the completion of each revolution of the new reel.

Figure 2:
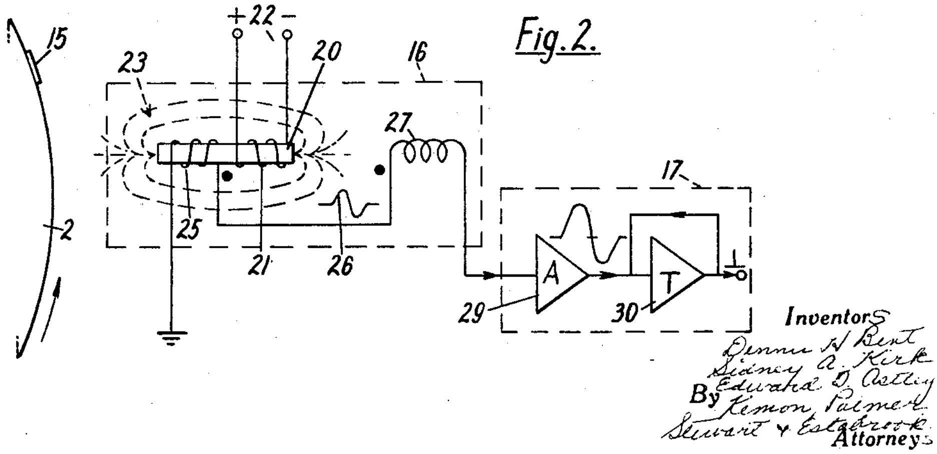

In order that the invention may be more clearly understood a particular example of an apparatus for splicing a new reel of preprinted paper on a rotary letter press without interrupting the operation of the letterpress will now be described with reference to the accompanying drawings, in which:

FIGURE 1 is a diagrammatic perspective view of part of a rotary letterpress embodying the invention; and FIGURE 2 is a diagrammatic representation of the principal electrical circuit components of the device for sensing the ferro-magnetic register mark on the new reel and thereupon generating an electric pulse for application to the register detecting means.

FIGURE 1 shows part of the reel stand 1 of a rotary letterpress after a new reel 2 of preprinted paper web has just been rotated into position for splicing with the preprinted paper web 3 from the expiring reel 4. An area 5 of adhesive material is provided on that surface of the end of the web on the reel 2 which is outermost. A paper tag 6 prevents the end of the web on the reel 2 from unwrapping inadvertently, but is provided with perforations (not shown) to enable it to be torn easily after the splicing operation. The expiring web 3 passes behind a bar 8 and then between a pasting brush 9 and the new reel 2 of paper to which it is to be spliced. The expiring web 3 carries a number of register marks 10 at given positions with respect to the positions of the preprinted pattern units 11. A photoelectric sensing device 12 is arranged to apply electric signals to the register detecting means 13 via the amplifying and pulse generating means 14 in response to the passage of register marks 10 on the expiring web 3. A tab 15 of thin homogeneous ferromagnetic foil is stuck by means of a suitable adhesive to the peripheral surface of the new reel 2 at a given position with relation to the pattern units on the web carried by the new reel. An electromagnetic sensing device 16, to be described more fully in connection with FIGURE 2, causes further electric signals to be applied to the register detecting means 13 from the amplifying and pulse-generating device 17 when it is stimulated by the passage of the register tab 15 on the new reel. When the signals received by the register-detecting means 13 from the sensing devices 12 and 16 respectively are in coincidence the register-detecting means 13 initiates the operation of the pasting mechanism causing the pasting brush 9 to be advanced towards the expiring web 3 to press the expiring web against the surface of the rotating reel 2 so that the adhesive layer 5 on the end of the web of the new reel sticks to the expiring web and advancement of the expiring web causes the perforated tag 6 securing the end of the new web to be torn away and the new web to be advanced together with the expiring web. A knife of conventional design (not shown) is also brought into operation by a signal from the register detecting means 13 to cut away the end of the expiring web after the web on the new reel has been spliced to it. The pasting and cutting devices require a finite time, of the order of one period of revolution of the new reel, in which to operate and so the tab of ferromagnetic foil 15 forming a register mark on the new reel 2 is displaced round the periphery of the new reel with respect to the positions of the positions of the pattern units on that periphery so that coincidence is detected by the register detecting means 13 at an instant before actual achievement of register between the pattern units on the new reel 2 and the expiring web 3, the displacement being sufficient to enable the pasting means to operate and splice the two webs when the actual register position is achieved.

FIGURE 2 illustrates the electromagnetic device 16 for sensing the register mark 15 on the periphery of the new reel together with the amplifying and pulse-generating means 17 and shows typical waveforms illustrating their operation. In this example the sensing device 16 comprises an electromagnet having a soft iron core 20 energised by the electric solenoid winding 21 connected across a D.C. supply 22. A field of magnetic flux 23 is generated by the electromagnet and the sensing device is mounted in such a position that the passage of the ferromagnetic register tab 15 on the periphery of the new reel 2 will produce a disturbance in the outermost fringes of this flux field 23. A generating coil 25 is also wound round the electromagnet core 20 and the electromagnetic disturbance produced in the magnetic flux field 23 generates a small electromotive force in the coil 25. The approximate waveform of this force is shown at 26. A pulse of one polarity is generated as the ferromagnetic register mark 15 of the new reel cuts the flux field 23 in one direction moving towards the electromagnet and this pulse is followed immediately by a pulse of opposite polarity generated as the ferromagnetic register mark moves away from the electromagnet. This change of polarity is sharp since the change of direction of relative movement of the ferromagnetic register mark 15 with respect to the mean line of flux of the flux field 23 is instantaneous.

The amplitude of the generated electromotive force is small and, therefore, to reduce the possibility that spurious transient electromagnetic fields will generate unwanted signals in the generator coil 25, a further coil 27 is provided on the axis of the generator 25, but substantially outside the influence of magnetic flux field 23. This further coil 27 is wound in antiphase with the generator coil 25 so that any spurious transient field cutting the coil 25 will also cut the coil 27, but will generate signals in the coil 27 which cancel out the spurious signals generated in coil 25. Because the coil 27 is substantially outside the influence of the flux field 23 it is unaffected by the passage of the ferromagnetic register mark 15 through the field 23.

The duration of the signal from the sensing device 16 is too long to be suitable for direct application to the register detecting means 13 without further processing and, therefore, after amplification in the linear amplifier 29 it is applied to a voltage-sensitive trigger circuit 30 which is arranged to generate an output pulse of short duration at the instant at which the voltage of the input signal from the sensing device 16 changes polarity. A suitable voltage-sensitive trigger circuit is the Multiar circuit described at page 468 of "Pulse and Digital Circuits" (McGraw and Hill) by Millman and Taub, the output pulse being taken from the cathode of the valve. The operation of the register detecting means 13 is described in the above-mentioned patents.

If desired the soft iron core 20 for the generator coil 25 could be replaced by a permanent magnetic core in which case the energising solenoid 21 could be omitted and alternative voltage-sensitive trigger circuits could be used, employing transistors for example.

Since the magnetic air gap is necessarily large, materials used conventionally for magnetic sensing are not suitable for this application since insufficient disturbance of the flux would be produced. The material used in this application needs to be a homogeneous ferromagnetic material, and since it has subsequently to pass through the printing machine without causing damage to the latter, it has to be of very thin cross-section. A thin ferromagnetic foil, affixed to the reel surface with a suitable adhesive, such as the tab 15 described, is the preferred form of register mark but a strip of ferromagnetic ink or a strip of magnetic tape could be used as alternatives, if desired.

We claim:

1. Apparatus for splicing a preprinted web on a rotating new reel with a similarly preprinted web from an expiring reel, comprising: first and second sensing devices, responsive respectively to the passage of a ferromagnetic register mark on the periphery of the rotating reel and the passage of register marks on the expiring web, for generating signals indicating the revolution of the new reel and the passage of pattern units on the expiring web; splicing means for splicing the expiring web to the web on the rotating new reel when the interval between signals from the first and second sensing devices indicates that a desired register condition exists between the preprinted webs; register detecting means responsive to signals from said first and second sensing devices for initiating the operation of said splicing means; and means for adjusting the position of the new reel so that a given distance, independent of the diameter of the new reel exists between the periphery of the new reel and the expiring web at splicing; said first sensing device being mounted adjacent to the position of operation of the splicing means on the side of the expiring web remote from the rotating reel for sensing the ferromagnetic register mark on the periphery of the rotating reel through the expiring web.

2. Apparatus according to claim 1 in which said first sensing device includes a magnetised core having a flux field and a generator coil surrounding said core in which signals indicating revolutions of the new reel are generated when the ferromagnetic register mark on the periphery of the new reel cuts the flux field of the magnetised core of the coil.

3. Apparatus according to claim 2 in which a further coil, wound oppositely to said generator coil, is arranged coaxially with said generator coil, but substantially outside the flux field of the magnetised core of said generator coil, and is electrically connected in series with the generator coil; whereby the effects of spurious signals generated in the generator coil by extraneous effects are reduced by opposing signals generated in the further coil by the same extraneous effects.

4. Apparatus according to claim 2 including a voltage-sensitive trigger pulse generator arranged to receive the signals generated by said generator coil and generate trigger pulses for application to said register-detecting means when the voltages of the signal from said generator coil changes in polarity.

References Cited by the Examiner

UNITED STATES PATENTS 2,627,596 2/53 Andrews ------------ 318—314 X
3,042,332 7/62 Astley --------------- 242—58.3

MERVIN STEIN, *Primary Examiner.*